United States Patent
Sisbot et al.

(10) Patent No.: US 9,202,353 B1
(45) Date of Patent: Dec. 1, 2015

(54) VIBRATION MODALITY SWITCHING SYSTEM FOR PROVIDING NAVIGATION GUIDANCE

(71) Applicant: Toyota Jidosha Kabushiki Kaisha, Aichi-ken (JP)

(72) Inventors: Emrah Akin Sisbot, Mountain View, CA (US); Akansel Cosgun, Atlanta, GA (US); Yusuke Nakano, Nagoya (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 7 days.

(21) Appl. No.: 14/012,283

(22) Filed: Aug. 28, 2013

Related U.S. Application Data

(60) Provisional application No. 61/785,344, filed on Mar. 14, 2013.

(51) Int. Cl.
| | |
|---|---|
| *G08B 1/06* | (2006.01) |
| *G08B 6/00* | (2006.01) |
| *G01C 21/20* | (2006.01) |
| *G01C 1/00* | (2006.01) |

(52) U.S. Cl.
CPC .. *G08B 6/00* (2013.01); *G01C 1/00* (2013.01); *G01C 21/20* (2013.01)

(58) Field of Classification Search
CPC .................................. G01C 1/00; G01C 21/20
USPC ...................... 340/539.13; 701/412
See application file for complete search history.

(56) References Cited

U.S. PATENT DOCUMENTS

| | | |
|---|---|---|
| 6,198,395 B1 | 3/2001 | Sussman |
| 6,320,496 B1 | 11/2001 | Sokoler et al. |
| 6,486,784 B1 | 11/2002 | Beckers |
| 6,662,141 B2 | 12/2003 | Kaub |
| 6,744,370 B1 | 6/2004 | Sleichter, III et al. |
| 6,774,788 B1 | 8/2004 | Balfe |
| 7,610,151 B2 | 10/2009 | Letchner et al. |
| 7,986,828 B2 | 7/2011 | Rao et al. |
| 8,166,421 B2 | 4/2012 | Magal et al. |
| 8,583,661 B2 | 11/2013 | Fujii et al. |
| 2002/0076100 A1 | 6/2002 | Luo |

(Continued)

OTHER PUBLICATIONS

Balachandran, Wamadeva et al., "A GPS Based Navigation Aid for the Blind," 17th International Conference on Applied Electromagnetics and Communications, Croatia, Oct. 1-3, 2003, pp. 34-36.

(Continued)

*Primary Examiner* — Shirley Lu
(74) *Attorney, Agent, or Firm* — Patent Law Works LLP

(57) ABSTRACT

The disclosure includes a system and method for switching vibration modalities based on conditions to provide navigation guidance. The system includes a tactile belt and a computing device. The computing device includes a modality module for receiving path data describing a path planned for a user associated with a tactile belt and location data describing a location of the user associated with the tactile belt, determining condition data based on the path data and the location data and determining a vibration modality based on the condition data. The condition data describes a direction change. The vibration modality describes a pattern for vibration and indicates a vibration signal. The system applies the vibration signal indicated by the vibration modality to the tactile belt to instruct the user associated with the tactile belt to follow the path.

27 Claims, 13 Drawing Sheets

(56) References Cited

U.S. PATENT DOCUMENTS

| | | |
|---|---|---|
| 2003/0037720 A1 | 2/2003 | Stockton |
| 2004/0091153 A1 | 5/2004 | Nakano et al. |
| 2004/0210358 A1 | 10/2004 | Suzuki et al. |
| 2006/0149621 A1 | 7/2006 | Do et al. |
| 2008/0004802 A1 | 1/2008 | Horvitz |
| 2008/0112592 A1 | 5/2008 | Wu et al. |
| 2008/0120025 A1 | 5/2008 | Naitou et al. |
| 2008/0120029 A1 | 5/2008 | Zelek et al. |
| 2008/0312709 A1 | 12/2008 | Volpe et al. |
| 2009/0252423 A1 | 10/2009 | Zhu et al. |
| 2010/0106603 A1 | 4/2010 | Dey et al. |
| 2010/0302138 A1 | 12/2010 | Poot et al. |
| 2010/0332126 A1 | 12/2010 | Huang et al. |
| 2011/0044506 A1 | 2/2011 | Chen |
| 2011/0054781 A1 | 3/2011 | Ohkubo |
| 2011/0210915 A1 | 9/2011 | Shotton et al. |
| 2011/0213628 A1 | 9/2011 | Peak et al. |
| 2011/0249865 A1 | 10/2011 | Lee et al. |
| 2011/0307172 A1 | 12/2011 | Jadhav et al. |
| 2011/0309926 A1 | 12/2011 | Eikelenberg et al. |
| 2011/0317871 A1 | 12/2011 | Tossell et al. |
| 2012/0070070 A1 | 3/2012 | Litvak |
| 2012/0095681 A1 | 4/2012 | An et al. |
| 2012/0150429 A1 | 6/2012 | Siotos |
| 2012/0184884 A1 | 7/2012 | Dyer et al. |
| 2013/0000156 A1 | 1/2013 | Andoh |
| 2013/0218456 A1* | 8/2013 | Zelek et al. ............... 701/412 |
| 2013/0265225 A1 | 10/2013 | Nasiri et al. |
| 2013/0317944 A1 | 11/2013 | Huang et al. |
| 2014/0009268 A1 | 1/2014 | Oshima et al. |
| 2014/0018985 A1 | 1/2014 | Gupta et al. |
| 2014/0114574 A1 | 4/2014 | Tertoolen et al. |
| 2014/0180526 A1 | 6/2014 | Deshpande et al. |

OTHER PUBLICATIONS

Edwards, Nathan et al., "A Pragmatic Approach to the Design and Implementation of a Vibrotactile Belt and Its Applications," 6 pages.
Heuten, Wilko et al., "Tactile Wayfinder: A Non-Visual Support System for Wayfinding," Proceedings: NordiCHI 2008, Oct. 20-22, 2008, 10 pages.
Koenig, Nathan, "Toward Real-Time Human Detection and Tracking in Diverse Environments," 5 pages.
Kulyukin, Vladimir et al., "A Robotic Wayfinding System for the Visually Impaired," 6 pages.
Melvin, A. Allan et al., "ROVI: A Robot for Visually Impaired for Collision-Free Navigation," Proceedings of the International Conference on Man-Machine Systems (ICoMMS), Malaysia, Oct. 11-13, 2009, 6 pages.
Pandey, Amit Kumar et al., "Towards a Sociable Robot Guide which Respects and Supports the Human Activity," 5th Annual IEEE Conference on Automation Science and Engineering, India, Aug. 22-25, 2009, 6 pages.
Pielot, Martin et al., "Evaluation of Continution Direction Encoding with Tactile Belts," 10 pages.
Rosenthal, Jacob et al., "Design Implementation and Case Study of a Pragmantic Vibrotactile Belt," 10 pages.
Spinello, Luciano et al., "A Layered Approach to People Detection in 3D Range Data," 6 pages.
Tsukada, Koji et al., "ActiveBelt: Belt-type Wearable Tactile Display for Directional Navigation," 16 pages.
Ulrich, Iwan et al., "The GuideCane—Applying Mobile Robot Technoloiges to Assist the Visually Impaired," IEEE Transactions on Systems, Man and Cybernetics—Part A: Systems and Humans, vol. 31, No. 2, Mar. 2001 pp. 131-136.
Van Erp, Jan B.F. et al., "Waypoint Navigation with a Virobtactile Waist Belt," ACM Transactions on Applied Perception, vol. 2, No. 2, Apr. 2005, pp. 106-117.
Xia, Lu et al., "Human Detection Using Depth Information by Kinect," 8 pages.
Koenig, "Toward Real-Time Human Detection and Tracking in Diverse Environments," IEEE 6th International Conference on Development and Learning (2007), pp. 94-98.
Fritsch, "Multi-modal anchoring for human-robot interaction," Robotics and Autonomous Systems 43 (2003) pp. 133-147.
Notice of Allowance mailed Apr. 7, 2015, U.S. Appl. No. 14/065,170 (15 pages).
Corrected Notice of Allowability mailed Apr. 29, 2015, U.S. Appl. No. 14/065,170 (6 pages).
Corrected Notice of Allowability mailed Jun. 30, 2015, U.S. Appl. No. 14/065,170 (6 pages).
Weir, U.S. Appl. No. 14/065,170, entitled, "Navigation System for Estimating Routes for Users," filed Oct. 28, 2013. (* pages).
Sisbot, U.S. Appl. No. 14/012,170, entitled "Tactile Belt System for Providing Navigation Guidance," filed Aug. 28, 2013. (* pages).
Cosgun et al., U.S. Appl. No. 14/012,194, entitled "Person Detection and Pose Estimation System," filed Aug. 28, 2013. (* pages).

* cited by examiner

720

VIBRATION MODALITY SWITCHING SYSTEM FOR PROVIDING NAVIGATION GUIDANCE

CROSS REFERENCE TO RELATED APPLICATION

This application claims priority under 35 USC §119(e) to U.S. Application No. 61/785,344, entitled "Free Moving Guide Robot" filed Mar. 14, 2013, the entirety of which is herein incorporated by reference.

BACKGROUND

1. Field of the Invention

The specification relates to a vibration modality switching system for navigation guidance. In particular, the specification relates to an automatic vibration modality switching system used on a tactile belt that guides a visually-impaired person to follow a path.

2. Description of the Background Art

Vibrotactile devices are used in a broad range of applications including waypoint navigation and facilitating navigation for people with reduced visual capacity. For example, the vibrotactile devices can be used in a person-guiding scenario, where the vibrotactile instructs a person to stay on a path. One of the main drawbacks of existing vibrotactile devices is that they often provide a single vibration modality and a continuous application of the same modality, which makes the user numb to the vibration itself. A person, who uses a device that vibrates all the time, will get used to the vibration, and after a certain time the person cannot feel any subtle change of vibration if any.

Another main drawback of the existing vibrotactile devices is that none of the existing vibrotactile devices are able to automatically change their vibration modality on-line depending on the path, the surrounding environment or information of the user. Most of the existing vibrotactile device has only one vibration modality, or at most a distinct stop vibration modality besides a single path following modality.

SUMMARY

The system overcomes the deficiencies of the prior art with systems and methods for switching vibration modalities based on conditions to provide navigation guidance for a user. In one embodiment, the system includes: a computing device and a tactile belt. The computing device includes a modality module and supporting hardware for switching the vibration modality of the tactile belt based on different conditions. In one embodiment, the modality module receives path data describing a path planned for a user associated with a tactile belt and location data describing a location of the user associated with the tactile belt, determines condition data based on the path data and the location data and determines a vibration modality based on the condition data. The condition data describes a direction change. The vibration modality describes a pattern for vibration and indicates a vibration signal. The system applies the vibration signal indicated by the vibration modality to the tactile belt to instruct the user associated with the tactile belt to follow the path.

In one embodiment, the vibration modality includes at least one of a periodic direction update modality, a large direction update modality, a large rotation update modality, a reinforcement modality and a stop modality. In one embodiment, the vibration signal includes at least one of a periodic impulse vibration signal, a constant vibration signal, a rotation vibration signal, a directional wave vibration signal and a stop vibration signal.

In one embodiment, the condition data further describes if the direction change is larger than a certain amount. In one embodiment, the condition data also includes rotation data that indicates if a user rotation is needed. In one embodiment, the condition data also includes destination data that indicates if a destination is within a certain distance. In one embodiment, the condition data also includes time data that indicates how long time has lapsed since last direction change occurred.

The system is particularly advantageous in numerous respects. First, the system provides a plurality of vibration modalities for guiding a user to follow a path. Second, the system switches the vibration modality dynamically depending on different conditions, which keeps the user alert to follow a path.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
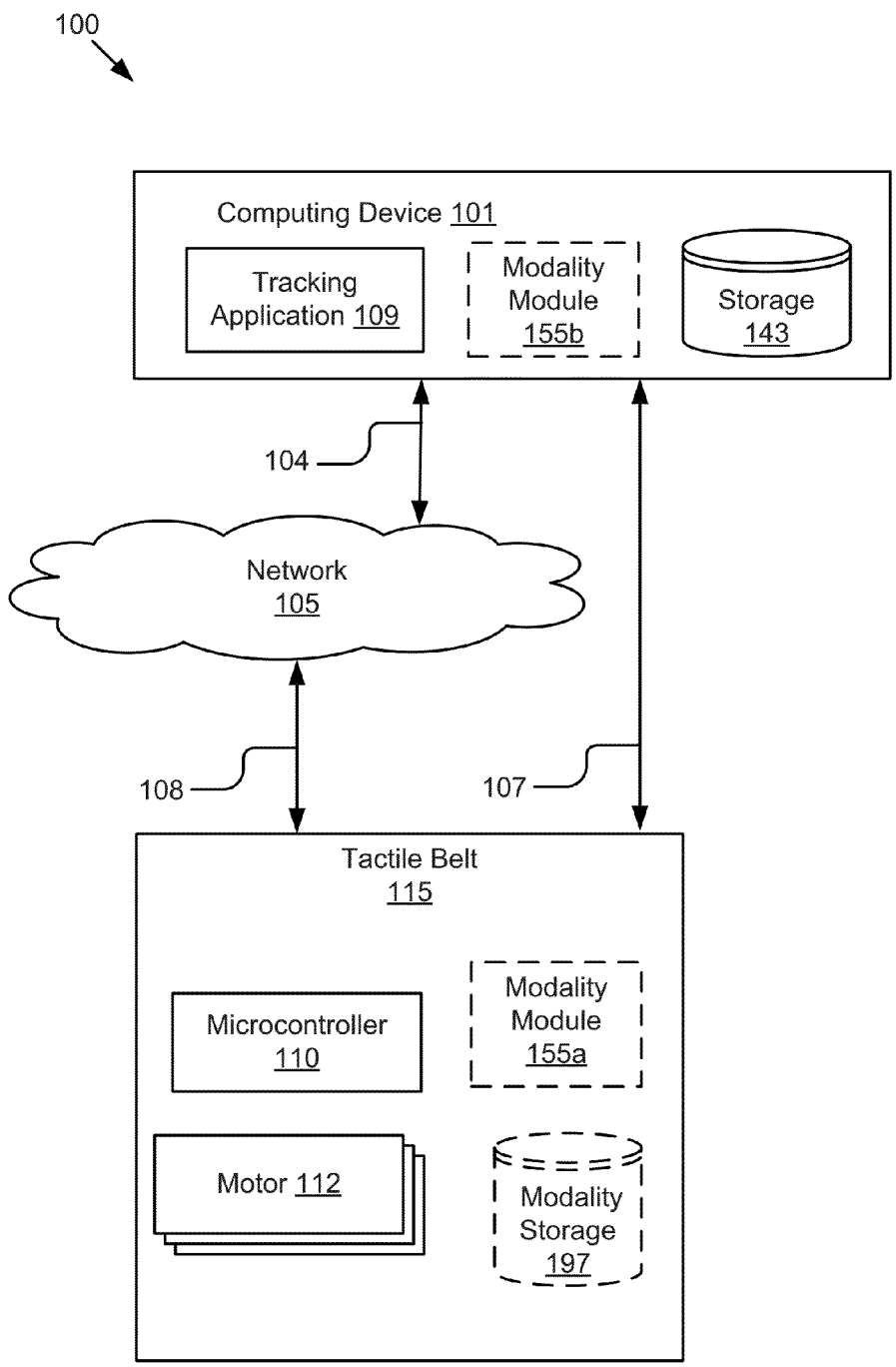
FIG. 1 is a high-level block diagram illustrating one embodiment of a system for switching vibration modalities based on conditions to provide navigation guidance for a user.

A system and method for switching vibration modalities based on conditions to provide navigation guidance for a user are described below. In the following description, for purposes of explanation, numerous specific details are set forth in order to provide a thorough understanding of the invention. It will be apparent, however, to one skilled in the art that the embodiments can be practiced without these specific details. In other instances, structures and devices are shown in block diagram form in order to avoid obscuring the invention. For example, the invention is described in one embodiment below with reference to client devices such as a smart phone and particular software and hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this invention, a computer-usable or computer readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for switching vibration modalities based on conditions to provide navigation guidance for a user according to one embodiment. The illustrated system 100 includes a computing device 101 and a tactile belt 115. In the illustrated embodiment, these entities of the system 100 are communicatively coupled via a network 105.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), or other interconnected data paths across which multiple devices may communicate. In some embodiments, the network 105 may be a peer-to-peer network. The network 105 may also be coupled to or includes portions of a telecommunications network for sending data in a variety of different communication protocols. In some embodiments, the network 105 includes Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the computing device 101 and the tactile belt 115, in practice one or more networks 105 can be connected to these entities.

The computing device 101 comprises a tracking application 109, a modality module 155b (also referred to herein individually and collectively as 155) and storage 143. In one embodiment, the modality module 155 can be stored on the tactile belt 115. For example, the modality module 155a can be stored on the tactile belt 115. In some embodiments, the modality module 155b can be incorporated into the tracking application 109. For example, the modality module 155b can be a component in the tracking application 109 for determining a vibration modality for the tactile belt 115 based on different conditions.

In one embodiment, the computing device 101 is a stationary device for tracking a location of the tactile belt 115 (or a location of a user associated with the tactile belt 115) in a confined space. For example, the confined space is a cluttered room. In one embodiment, the computing device 101 uses hardware such as a laser scanner to determine the position of the tactile belt 115. In some implementations the laser scanner is a UTM-30LX-EW laser scanner made by Hokuyo, or a motion sensing device such as the Microsoft® Kinect. In one embodiment, the computing device 101 is connected to the tactile belt 115 via signal line 116 using a serial port (e.g. a RS-232 serial port) or a universal serial bus (USB).

In another embodiment, the computing device 101 is communicatively coupled to the network 105 via signal line 104 and communicates wirelessly with the tactile belt 115. For example, the computing device 101 can be a mobile device that moves along with the tactile belt 115 through multiple indoor rooms or in the outdoors.

The tracking application 109 is code and routines for tracking a location of the tactile belt 115 (or a location of a user associated with the tactile belt 115), determining a path describing where the user of the tactile belt 115 should move and transmitting vibration signals to the tactile belt 115. In some embodiments, the tracking application 109 tracks the movement of the user associated with the tactile belt 115 to determine whether the instructions worked and, if not, the tracking application 109 modifies the instructions in the future. In some embodiments, the tracking application 109 receives vibration signals from the modality module 155 indicated by different vibration modalities to provide guidance. Examples for the vibration modalities can include, but not limited to, a periodic direction update modality, a large direction update modality, a large rotation modality, a reinforcement modality and a stop modality, etc. The tracking application 109 sends the vibration signals to the tactile belt 115.

The modality module 155 is code and routines for determining a vibration modality for the tactile belt 155 to guide a user of the tactile belt 115 based on a path and a user's location determined by the tracking application 109. In some embodiments, the modality module 155 receives path data describing a path planned for a user of a tactile belt 115 and location data describing a location for the user of the tactile belt 115 from the tracking application 109. The modality module 155 determines condition data based on the path data and the location data. In some embodiments, the condition data describes a direction change for the user. The modality module 155 determines a vibration modality for the tactile belt 115 based on the condition data and selects a corresponding vibration signal based on the modality. In some embodiments, the modality module 155 sends the vibration signal to the tactile belt 115 via the tracking application 109 to control the motors 112 included in the tactile belt 115 to vibrate accordingly so that the user can be guided to follow the path. The modality module 155 will be described in further detail below with reference to FIGS. 2B and 4-6.

The tactile belt 115 comprises a belt harness, a microcontroller 110 and motors 112. The belt harness is made of an elastic material, for example rubber woven in with cloth. The elastic material helps secure the motors 112 into the belt harness and keeps them in fixed positions because the angles between the motors remain static regardless of how much the elastic is flexed. The belt harness can be covered with material to make it more aesthetically pleasing. For example, the belt harness could be glued to leather and a belt buckle could be added. While FIG. 1 illustrates one tactile belt 115, the disclosure could apply to a system architecture having one or more tactile belts 115.

In one embodiment, the tactile belt 115 obtains power and data from the computing device 101 via a RS-232 serial port that is connected to the tactile belt 115. The tactile belt 115 further includes an internal USB-to-serial converter. Persons of ordinary skill in the art will recognize that other connectors are possible, for example, a USB, a mini-USB, etc.

In another embodiment, the tactile belt 115 including a communication unit for wirelessly communicating data to and from the computing device 101. For example, the communication unit uses Bluetooth to communicate data including the location of the tactile belt 115. In another embodiment, the location of the tactile belt 115 is determined through a global positioning system (GPS), radio-frequency identification (RFID), etc.

The microcontroller 110 is a computing device implemented on a single integrated circuit that includes a processor, a memory and one or more programmable input/output peripherals. In some embodiments, the microcontroller 110 includes one or more embedded memories (e.g., a static random access memory (SRAM), an electrically erasable programmable read-only memory (EEPROM), a flash memory, etc.). For example, the microcontroller 110 is an Arduino Uno, which is a version of the Arduino Open Source hardware platform.

The microcontroller 110 receives a signal from the tracking application 109 or the modality module 155. For example, the tracking application 109 could transmit a Robotics Operating System (ROS) message to the microcontroller 110. The signal comprises a bit sequence and a vibration intensity value for each of the motors 112 (e.g. for eight motors). Each bit in the bit sequence indicates if the motor 112 is going to vibrate or not during the corresponding time slot. The time slot could be any amount, for example, 1/16 seconds. The bit sequences for each motor 112 are read sequentially according to the time slot (e.g. every 1/16 seconds). If the bit is 1, the corresponding motor 112 vibrates with specified intensity; if the bit is 0, the corresponding motor 112 does not vibrate. The bit sequence and the vibration intensity values form a vibration pattern, which incorporates the activation frequency, duration and rhythm of vibrations for all motors. In some embodiments, the signal is indicated by the vibration modality determined by the modality module 155.

In some examples, the microcontroller 110 includes one or more general purpose input/output (GPIO) pins, each configurable to either an input state or an output state. For example, a first GPIO pin in the microcontroller 110 can be configured to an output state to drive a first motor 112; a second GPIO pin can be configured to an input state to drive a second GIPO pin, etc. The microcontroller 110 may include other components for providing the functionality described herein.

The microcontroller 110 applies corresponding sequences of voltages to the motors 112. For example, the microcontroller 110 uses pin switching on eight of the digital output pins in the main loop (where the eight motors are used) to provide Pulse Width Modulation. In some embodiments, the vibration intensities are achieved by PWM at 10-30 kHz, e.g. 20 kHz. Since the motors 112 are actuated in the main loop, the vibrations are synchronous. In some embodiments, the microcontroller 110 drives the motors with a ULN2803A chip, which can drive up to eight motors.

In some embodiment, the motors 112 vibrate based on different vibration modalities. In some embodiments, each motor 112 is attached to a light-emitting diode (LED) for debugging purposes. For example, when the motor 112 is working, the LED is green. When the motor 112 is experiencing a problem, the LED is red. In some embodiments, the motors 112 vibrate in a different pattern to signal a problem with at least one of the motors. This could be advantageous to signify to visually-challenged users that there is a problem with a motor.

The tactile belt 115 is useful for guiding people that are visually impaired. For example, people that are blind, helping firefighters in a smoky building, etc. The tactile belt 115 could be used in other situations, for example, to help people with dementia that get easily confused with directions or objects.

Example Tracking Application

Figure 2A:
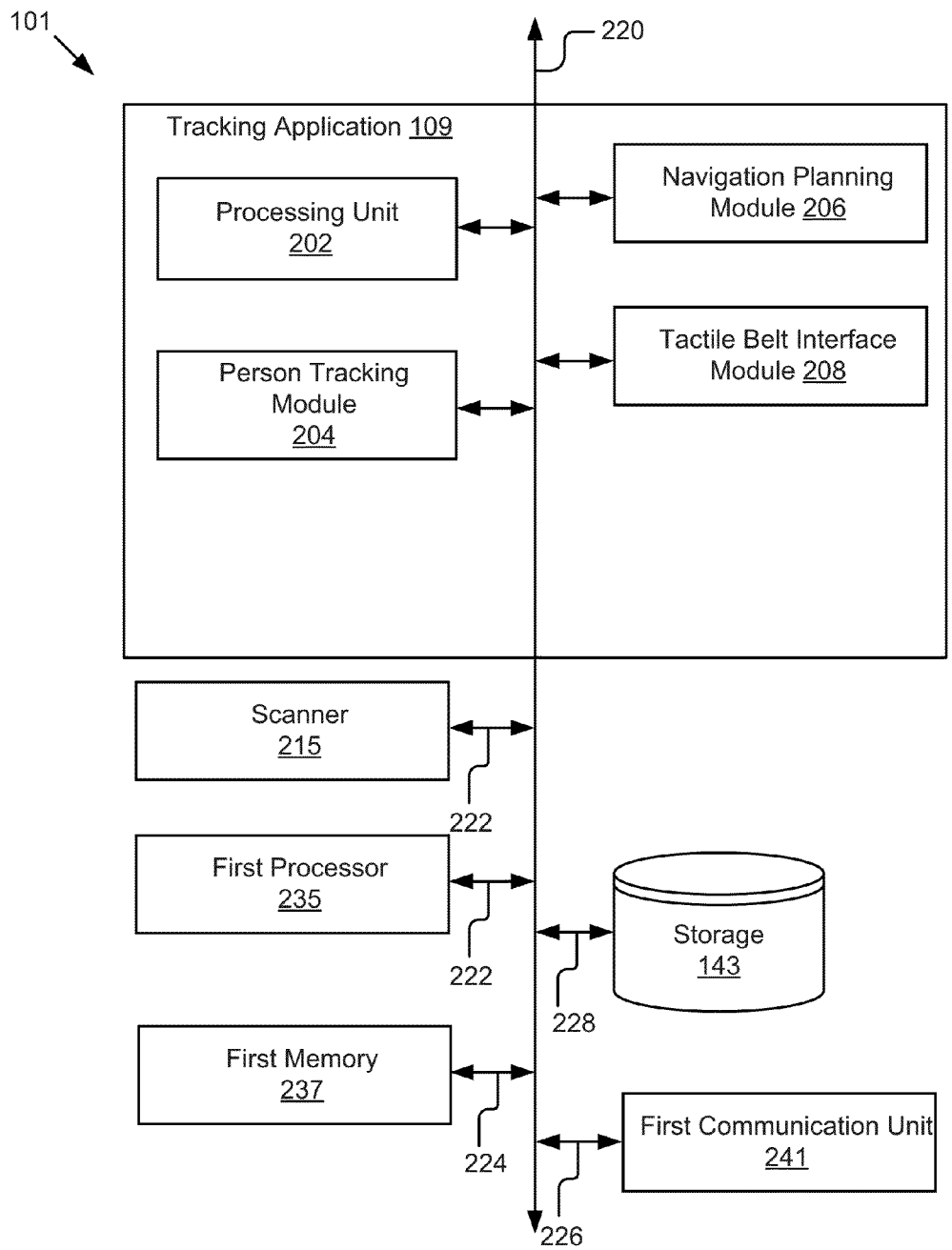
FIG. 2A is a block diagram illustrating one embodiment of a tracking application.

Referring now to FIG. 2A, an example of the tracking application 109 is shown in more detail. FIG. 2A is a block diagram of a computing device 101 that includes a tracking application 109, optionally a scanner 215, a first processor 235, a first memory 237 and a first communication unit 241 according to some examples. In some embodiments, the computing device 101 additionally includes a storage device 143. The components of the computing device 101 are communicatively coupled by a bus 220.

The scanner 215 is hardware for tracking a position and orientation of a user that is wearing the tactile belt 115 and for tracking the position and orientation of objects. For example, the scanner 215 could be a UTM-30LX-EW laser scanner made by Hokuyo. The UTM-30LX-EW laser scanner tracks the position and orientation of the user that is wearing the tactile belt 115 and objects at 30 Hz. In another embodiment, the scanner 215 is a motion sensing input device, such as Microsoft® Kinect. The scanner 215 captures images of the user and objects and transmits the images to the tracking application 109. In some embodiments, the scanner 215 can be manipulated by an administrator to change the angle for capturing images.

In some embodiment the computing device 101 is a mobile computing device 101. For example, the computing device 101 is a robot. The robot moves in the environment and freely explores unknown places while keeping the tactile belt 115 in the scanner's 215 field of view. The scanner 215 captures images of the tactile belt 115 and the objects at different distances, and transmits the data along with the distance travelled by the computing device 101 to get a better depth perspective.

The first processor 235 includes an arithmetic logic unit, a microprocessor, a general purpose controller or some other processor array to perform computations and provide electronic display signals to a display device. The first processor 235 is coupled to the bus 220 for communication with the other components via signal line 222. The first processor 235 processes data signals and may include various computing architectures including a complex instruction set computer (CISC) architecture, a reduced instruction set computer (RISC) architecture, or an architecture implementing a combination of instruction sets. Although FIG. 2A illustrates a single processor 235, multiple processors 235 may be included in the tracking application 109. Other processors, operating systems, sensors, displays and physical configurations are possible.

The first memory 237 stores instructions or data that can be executed by the first processor 235. The first memory 237 is coupled to the bus 220 for communication with the other components via signal line 224. The instructions or data may include code for performing the techniques described herein. The first memory 237 may be a dynamic random access memory (DRAM) device, a static random access memory (SRAM) device, flash memory or some other memory device. In some embodiments, the first memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The first communication unit 241 transmits and receives data to and from the tactile belt 115. In some embodiments, the first communication unit 241 transmits data to the tactile belt 115, but does not receive data from the tactile belt 115. The first communication unit 241 is coupled to the bus 220 via signal line 226. In some embodiments, the first communication unit 241 includes a port for direct physical connection to the network 105 or to another communication channel. For example, the first communication unit 241 includes an RS-232, USB, SD, CAT-5 or similar port for wired communication with the client device 115. In some embodiments, the first communication unit 241 includes a wireless transceiver for exchanging data with the tactile belt 115 or other communication channels using one or more wireless communication methods, including IEEE 802.11, IEEE 802.16, BLUETOOTH® or another suitable wireless communication method.

In some embodiments, the first communication unit 241 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some embodiments, the first communication unit 241 includes a wired port and a wireless transceiver. The first communication unit 241 also provides other conventional connections to the network 105 for distribution of files or media objects using standard network protocols including TCP/IP, HTTP, HTTPS and SMTP, etc.

The storage device 143 can be a non-transitory memory that stores data for providing the functionality described herein. The storage device 143 may be a dynamic random access memory (DRAM) device, a static random access memory (SRAM) device, flash memory or some other memory devices. In some embodiments, the storage device 143 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the storage device 143 is communicatively coupled to the bus 220 via signal line 228. In one embodiment, the storage device 143 stores location data describing the location of the tactile belt 115, path data describing a path for the tactile belt 115, instructions provided to the tactile belt 115 and outcomes based on those instructions. For example, if the tracking application 109 instructs the tactile belt 115 to move north and the user of the tactile belt 115 bumps into an object, the storage 143 includes the user's location, the path, the instructions, the timing information and modifications made by the tracking application 109 to change one of the variables to better guide the user of the tactile belt 115. In some embodiments, the storage device 143 may store other data for providing the functionality described herein.

In the illustrated embodiment shown in FIG. 2A, the tracking application 109 includes a processing unit 202, a tracking module 204, a navigation planning module 206 and a tactile belt interface 208. The components of the tracking application 109 are communicatively coupled via the bus 220.

The processing unit 202 can be software including routines for handling communications between the tracking application 109 and other components of the computing device 200. In one embodiment, the processing unit 202 can be a set of instructions executable by the first processor 235 to provide the functionality described below for handling communications between the tracking application 109 and other components of the computing device 101. In another embodiment, the processing unit 202 can be stored in the first memory 237 of the computing device 101 and can be accessible and executable by the first processor 235. In either embodiment, the processing unit 202 can be adapted for cooperation and communication with the first processor 235 and other components of the computing device 101.

In one embodiment, the processing unit 202 receives location data describing the location of the tactile belt 115 (or the location of a user associated with the tactile belt 115) from the scanner 215. In another embodiment, the processing unit 202 receives location data of the tactile belt 115 from the first communication unit 241. The processing unit 202 sends data to the tactile belt 115 via the first communication unit 241. In some embodiments, the processing unit 202 sends data to the modality module 155 via the first communication unit 241.

The tracking module 204 can be software including routines for determining a location of the tactile belt 115 (or a location of a user associated with the tactile belt 115) and the location of objects in proximity to the tactile belt 115. In one embodiment, the tracking module 204 can be a set of instructions executable by the first processor 235 to provide the functionality described below for determining a location of the tactile belt 115 and the location of objects as a function of time. In another embodiment, the tracking module 204 can be stored in the first memory 237 of the computing device 101 and can be accessible and executable by the first processor 235. In either embodiment, the tracking module 204 can be adapted for cooperation and communication with the first processor 235 and other components of the computing device 101.

In one embodiment, the tracking module 204 receives images of the tactile belt 115 and objects in proximity to the tactile belt 115 from the scanner 215 via the processing unit 202. Each image is associated with a time of capture (e.g., a timestamp). The tracking module 204 uses the images of the tactile belt 115 and objects in proximity to the tactile belt 115 to determine the coordinate location of the tactile belt 115 and the objects. For example, the tracking module 204 determines the distance between objects.

In the embodiment where the computing device 101 is mobile and the scanner 215 provides multiple images and a distance travelled, the tracking module 204 uses the images and the distance travelled to determine the distance between objects. In some embodiments, the tracking module 204 determines the path and speed of the tactile belt 115. For example, the tracking module 204 determines that the user associated with the tactile belt 115 is moving 79 degrees at 2.5 miles per hour. In some embodiments, the tracking module 204 tracks the distance of the tactile belt 115 between objects and the distance of the computing device 101 (e.g. the robot) between objects.

In one embodiment, the tracking module 204 instructs the tactile belt interface module 208 to generate a user interface for an administrator to identify for confirm the tactile belt 115 in the image. For example, the user interface includes an image of the tactile belt 115 and the objects, and the user interface asks the administrator to click on the tactile belt 115. The tracking module 204 receives the user input and tracks the movement of the user associated with the tactile belt 115 in subsequent frames based on the user input.

The navigation planning module 206 can be software including routines for determining a path and generating linear and angular velocities for the path. In one embodiment, the navigation planning module 206 can be a set of instructions executable by the first processor 235 to provide the functionality described below for determining a path and generating linear. In another embodiment, the navigation planning module 206 can be stored in the first memory 237 of the computing device 200 and can be accessible and executable by the first processor 235. In either embodiment, the navigation planning module 206 can be adapted for cooperation and communication with the first processor 235 and other components of the computing device 101.

The navigation planning module 206 determines a path to avoid at least one object in proximity to the tactile belt 115. In one embodiment, the navigation planning module 206 models the tactile belt 115 as a non-holonimic robot with a circular footprint and uses a robot operating system (ROS) navigation stack for path planning, which provides local planning algorithms for mobile robots. The path is planned in time increments, for example, every 500 milliseconds (ms), every 100 ms, every second, etc.

In some embodiments, the navigation planning module 206 determines linear and angular velocities based on the path that the user of the tactile belt 115 should execute to stay on the course of the path. For example, the navigation planning module 206 determines that the user of the tactile belt 115 could walk between two objects to avoid a collision. In some embodiments, the navigation planning module 206 also determines a distance from the user of the tactile belt 115 to an object along the path. The navigation planning module 206 also determines if the distance is larger than a threshold distance. In some embodiments, the navigation planning module 206 determines, based on the user's velocity, if there is enough time for the user of the tactile belt 115 to avoid the object by changing a moving direction.

Example Modality Module

Figure 2B:
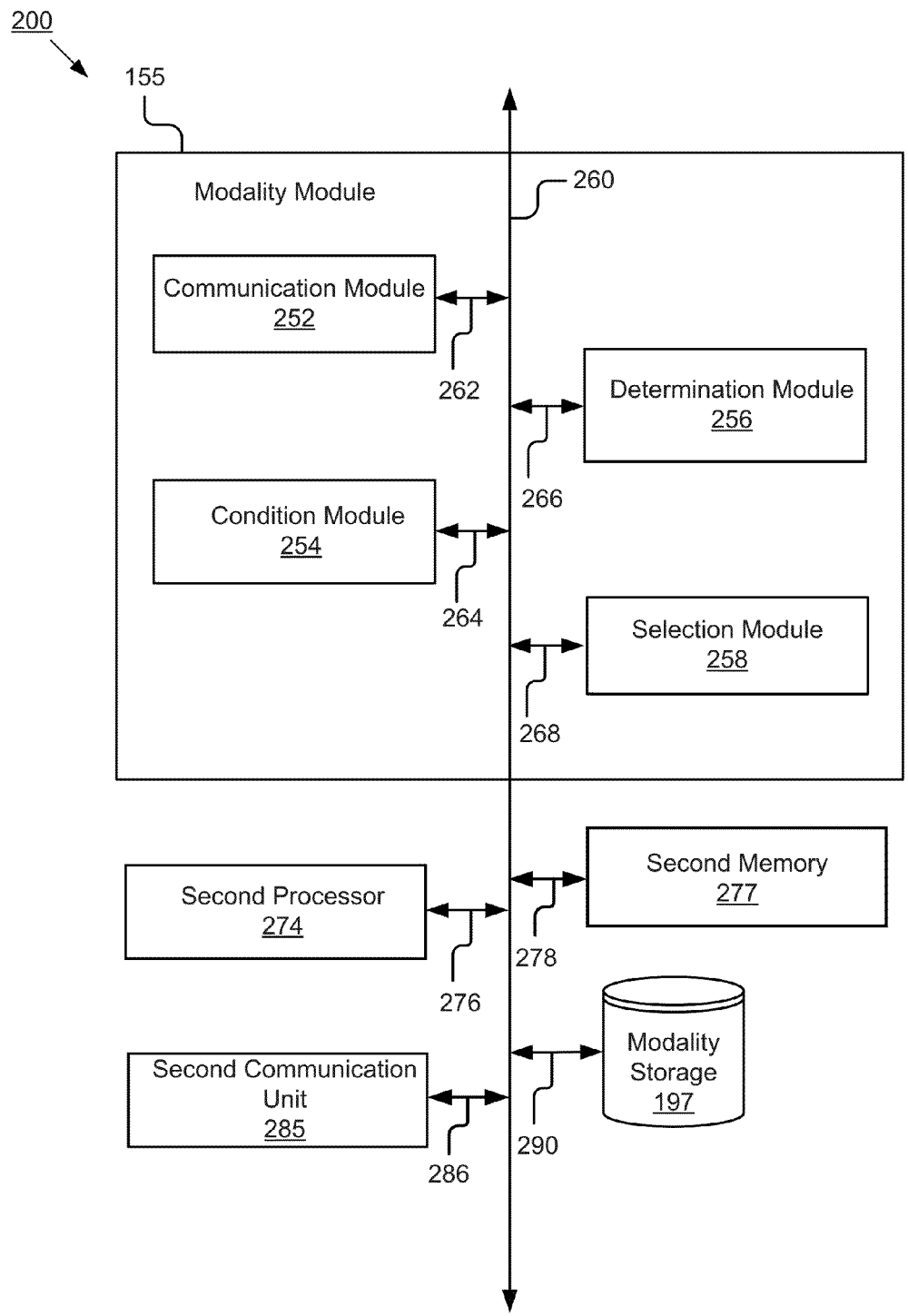
FIG. 2B is a block diagram illustrating one embodiment of a modality module.

Referring now to FIG. 2B, an example of the modality module 155 is shown in more detail. FIG. 2B is a block diagram of a device 200 that includes a modality module 155, a second processor 274, a second memory 277 and a second communication unit 285 according to some examples. In some embodiments, the device 200 additionally includes a modality storage device 197. The components of the device 200 are communicatively coupled by a bus 260. In some embodiments, the device 200 can be one of a tactile belt 115 and a computing device 101, or the functional components can be distributed between the tactile belt 115 and the computing device 101.

The second processor 274 includes an arithmetic logic unit, a microprocessor, a general purpose controller or some other processor array to perform computations and provide electronic display signals to a display device. The second processor 274 is coupled to the bus 260 for communication with the other components via signal line 276. The second processor 274 processes data signals and may include various computing architectures including a complex instruction set computer (CISC) architecture, a reduced instruction set computer (RISC) architecture, or an architecture implementing a combination of instruction sets. Although FIG. 2B illustrates a single processor 274, multiple processors 274 may be included in the device 200. Other processors, operating systems, sensors, displays and physical configurations are possible.

The second memory 277 stores instructions or data that can be executed by the second processor 274. The second memory 277 is coupled to the bus 260 for communication with the other components via signal line 278. The instructions or data may include code for performing the techniques described herein. The second memory 277 may be a dynamic random access memory (DRAM) device, a static random access memory (SRAM) device, flash memory or some other memory device. In some embodiments, the second memory 277 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The second communication unit 285 transmits and receives data to and from at least one of the tactile belt 115 and the computing device 101 depending upon where the modality module 155 is stored. The second communication unit 285 is coupled to the bus 260 via signal line 286. In some embodiments, the second communication unit 285 includes a port for direct physical connection to the network 105 or to another communication channel. For example, the second communication unit 285 includes a USB, SD, CAT-5 or similar port for wired communication with the tactile belt 115. In some embodiments, the second communication unit 285 includes a wireless transceiver for exchanging data with the tactile belt 115 or other communication channels using one or more wireless communication methods, including IEEE 802.11, IEEE 802.16, BLUETOOTH® or another suitable wireless communication method.

In some embodiments, the second communication unit 285 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some embodiments, the second communication unit 285 includes a wired port and a wireless transceiver. The second communication unit 285 also provides other conventional connections to the network 105 for distribution of files or media objects using standard network protocols including TCP/IP, HTTP, HTTPS and SMTP, etc.

The modality storage 197 can be a non-transitory memory that stores data for providing the functionality described herein. The modality storage 197 may be a dynamic random access memory (DRAM) device, a static random access memory (SRAM) device, flash memory or some other memory devices. In some embodiments, the modality storage 197 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the modality storage 197 is communicatively coupled to the bus 260 via signal line 290. In one embodiment, the modality storage 197 stores one or more of path data, user location data and vibration modality data. In some embodiments, the modality storage 197 may store other data for providing the functionality described herein. The modality storage 197 will be described in further detail with reference to FIG. 3.

In the illustrated embodiment shown in FIG. 2B, the modality module 155 includes a communication module 252, a condition module 254, a determination module 256 and a selection module 258. The components of the modality module 155 are communicatively coupled via the bus 260.

The communication module 252 can be software including routines for handling communications between the modality module 155 and other components of the device 200. In one embodiment, the communication module 252 can be a set of instructions executable by the second processor 274 to provide the functionality described below for handling communications between the modality module 155 and other components of the device 200. In another embodiment, the communication module 252 can be stored in the second memory 277 of the device 200 and can be accessible and executable by the second processor 274. In either embodiment, the communication module 252 can be adapted for cooperation and communication with the second processor 274 and other components of the device 200 via signal line 262.

In some embodiments, the communication module 252 sends and receives data, via the second communication unit 285, to and from the components of one or more of a tactile belt 115 and a computing device 101. For example, the communication module 252 receives, via the second communication unit 285, path data describing a path planned for a user associated with a tactile belt 115 and location data describing a location of the user associated with the tactile belt 115 from the tracking application 109. In some embodiments, the communication module 252 is instructed by the selection module 207 to send, via the second communication unit 285, a vibration signal indicated by a vibration modality to the microcontroller 110 to control the motors 112 to vibrate based on the vibration signal.

In some embodiments, the communication module 252 receives data from components of the modality module 155 and stores the data in the storage device 143 or the modality storage 197. For example, the communication module 252 receives modality data describing a vibration modality from the determination module 255 and stores the modality data in the modality storage 197. In some embodiments, the communication module 252 retrieves data from the storage device 143 or the modality storage 197 and sends the data to components of the modality module 155. For example, the communication module 252 retrieves signal data describing a vibration signal indicated by a modality from the modality storage 197 and sends the retrieved signal data to the selection module 207.

The condition module 254 can be software including routines for determining condition data based on path data and location data. In one embodiment, the condition module 254 can be a set of instructions executable by the second processor 274 to provide the functionality described below for determining condition data based on path data and location data. In another embodiment, the condition module 254 can be stored in the second memory 277 of the device 200 and can be accessible and executable by the second processor 274. In either embodiment, the condition module 254 can be adapted for cooperation and communication with the second processor 274 and other components of the device 200 via signal line 264.

In some embodiments, the condition module 254 controls the communication module 252 to retrieve path data and location data from the tracking application 109. In some embodiments, path data describes a path planned by the tracking application 109 for a user associated with the tactile belt 115. For example, the tracking application 109 determines an obstacle free path to a destination for a user associated with the tactile belt 115 who is blind. The path data can be determined by the tracking application 109 dynamically and describes where the user should move at sequential time intervals. In some embodiments, location data describes a location of a tactile belt 115 or a user associated with the tactile belt 115. For example, the location can be described using latitude and longitude. In some embodiments, the condition module 254 also receives velocity data describing linear and angular velocities the user of the tactile belt 115 should execute to stay on the course of the path.

In some embodiments, the condition module 254 determines condition data based on the path data, location data or velocity data received from the tracking application 109. For example, condition data describes one or more conditions for a user associated with a tactile belt 115 following the path. For example, the condition module 254 determines condition data periodically in a certain interval, e.g., every one second, every five seconds, every 10 seconds, every 50 seconds, etc. In some embodiments, the condition data includes direction data describing a direction change. In some embodiments, the direction data indicates how large a direction change is. For example, the direction data indicates that a direction change is 0.5 radian ("rad"). In some embodiments, the direction data also indicates a direction towards which a user of the tactile belt 115 should turn. For example, the direction data indicates that a direction change is clockwise. In another example, the direction data indicates that a direction change is counterclockwise. In yet another example, the direction data indicates that a user associated with the tactile belt 115 should turn 0.3 rad clockwise.

In some embodiments, the condition data includes rotation data that indicates if a user rotation is needed. For example, the rotation data indicates a user of the tactile belt 115 needs to rotate around self to follow the path. Generally, if the direction change is too large or the distance to an obstacle is less than a threshold distance, the user of the tactile belt 115 should rotate around self to stay on the course of the path while avoiding bumping against the obstacle within the threshold distance. In some embodiments, the condition data includes destination data that indicates if a destination is within a certain distance. For example, the destination data indicates that the destination is close enough to a user of the tactile belt 115 and the user is 1 meter away from the destination. In some embodiments, the condition data includes time data that indicates how long time has lapsed since last direction change occurred. For example, the time data indicates a certain period of time (e.g., five seconds, 10 seconds, 50 seconds, one minute, etc.) has lapsed since a user of the tactile belt 115 changed the moving direction last time. In some embodiments, the condition module 254 sends condition data to the determination module 256.

The determination module 256 can be software including routines for determining a vibration modality based on condition data. In one embodiment, the determination module 256 can be a set of instructions executable by the second processor 274 to provide the functionality described below for determining a vibration modality based on condition data.

In another embodiment, the determination module 256 can be stored in the second memory 277 of the device 200 and can be accessible and executable by the second processor 274. In either embodiment, the determination module 256 can be adapted for cooperation and communication with the second processor 274 and other components of the device 200 via signal line 266.

In some embodiments, the determination module 256 receives condition data from the condition module 254 and determines a vibration modality for the tactile belt 115 based on the condition data. A vibration modality describes a pattern for vibration of the tactile belt 115 that conveys an instruction to a user of the tactile belt 115 to follow a path. For example, a vibration modality indicates a certain pattern of vibration that instructs a user of the tactile belt 115 to turn 0.2 rad counterclockwise to follow the path. In some embodiments, a vibration modality includes at least one of a periodic direction update modality, a large direction update modality, a large rotation update modality, a reinforcement modality and a stop modality. For example, a periodic direction update modality indicates a vibration pattern instructing a user of the tactile belt 115 to move towards a direction. A large direction update modality indicates a vibration pattern instructing a user of the tactile belt 115 to turn onto a new direction substantially different from a previous direction. A large rotation update modality indicates a vibration pattern instructing a user of the tactile belt 115 to rotate around self to follow a new direction substantially different from a previous direction. For example, the direction change is so large that a user rotation is needed for the user to stay on the course of the path. A reinforcement modality indicates a vibration pattern instructing a user of the tactile belt 115 to keep following a direction. A stop modality indicates a vibration pattern instructing a user of the tactile belt 115 to stop going forward.

In some embodiments, the determination module 256 determines different vibration modalities based on different condition data. In some embodiments, if the determination module 256 determines that a direction change that a user of the tactile belt 115 should make to stay in a path is less than a certain amount, the determination module 256 determines that a periodic direction update modality should be used. For example, if the determination module 256 determines, based on the condition data, that a user of the tactile belt 115 should turn less than 0.3 rad, the determination module 256 determines to use a periodic direction update modality. In some embodiments, if the determination module 256 determines that a direction change that a user of the tactile belt 115 should make is more than a certain amount and the determination module 256 determines that a user rotation is not needed, then the determination module 256 determines a large direction update modality. For example, if the determination module 256 determines, based on the condition data, that a user of the tactile belt 115 has to make a turn larger than 0.3 rad and that the user does not need to rotate around self, the determination module 256 determines to use a large direction update modality. In some embodiments, if the determination module 256 determines that a direction change that a user of the tactile belt 115 should make is more than a certain amount and the determination module 256 determines that a user rotation is needed, then the determination module 256 determines a large rotation update modality. For example, if the determination module 256 determines, based on the condition data, that a user of the tactile belt 115 has to make a turn larger than 0.3 rad and that the user also needs to rotate around self to follow the path, the determination module 256 determines to use a large rotation update modality.

In some embodiments, if the determination module 256 determines that a direction change that a user of the tactile belt 115 should make to stay in a path is less than a certain amount and the determination module 256 also determines that a certain period of time has lapsed since last direction change, then the determination module 256 determines that a reinforcement modality should be used. For example, if the determination module 256 determines, based on the condition data, that a user of the tactile belt 115 only needs to turn less than 0.3 rad and it has been 30 seconds since last direction change, the determination module 256 determines to user a reinforcement modality. In some embodiments, if the determination module 256 determines, based on the condition data, that a user of the tactile belt 115 is close enough to the destination (e.g., the destination is within 0.5 meter to the user), the determination module 256 determines that a stop modality need to be used. In some embodiments, the determination module 256 sends the determined vibration modality to the selection module 258.

The selection module 258 can be software including routines for selecting a vibration signal based on a vibration modality. In one embodiment, the selection module 258 can be a set of instructions executable by the second processor 274 to provide the functionality described below for selecting a vibration signal based on a vibration modality. In another embodiment, the selection module 258 can be stored in the second memory 277 of the device 200 and can be accessible and executable by the second processor 274. In either embodiment, the selection module 258 can be adapted for cooperation and communication with the second processor 274 and other components of the device 200 via signal line 268.

In some embodiments, the selection module 258 receives a determined vibration modality from the determination module 256. For example, the vibration modality can be one of a periodic direction update modality, a large direction update modality, a large rotation update modality, a reinforcement modality and a stop modality. The selection module 258 determines a vibration signal based on the vibration modality. In some embodiments, the selection module 258 retrieves vibration modality data from the modality storage 197. The vibration modality data stored in the modality storage 197 describes the correspondence between a vibration modality and a vibration signal. For example, periodic direction update modality data describes a periodic impulse vibration signal indicated by a periodic direction update modality. The selection module 258 selects a vibration signal indicated by a modality based on the vibration modality data.

Examples of vibration signals can include, but not limited to, a periodic impulse vibration signal, a constant vibration signal, a rotation vibration signal, a directional wave vibration signal and a stop vibration signal. In some embodiments, a periodic impulse vibration signal is indicated by a periodic direction update modality. The periodic impulse vibration signal is a periodical pulse vibration to indicate a direction. For example, periodically a pulse single indicating a direction is sent to the tactile belt 115.

In some embodiments, a constant vibration signal is indicated by a large direction update modality. The constant vibration signal is a signal causing a constant vibration of one or more motors 112 to indicate a direction.

In some embodiments, a rotation vibration signal is indicated by a large rotation update modality. The rotation vibration signal is a signal including sequential vibration commands causing different vibrators or motors 112 to vibrate in a certain order so that a user wearing the tactile belt 115 feels that a turn to a direction indicated by the order is needed. For example, a tactile belt 115 includes eight motors placed on the belt 115 at the same distance interval. The rotation vibration signal causes three of the motors 112 (e.g., the first motor 112 next to the second motor 112, the second motor 112 next to the third motor 112, or the second motor 112 is in between the first motor 112 and the second motor 112) to vibrate one by one. For example, the rotation vibration signal causes the first motor 112 to vibrate firstly, the second motor 112 to vibrate secondly and the third motor 112 to vibrate lastly. In this way, the tactile belt 115 vibrates based on the rotation vibration signal, causing the user of the tactile belt 115 to recognize a need of a turn from the direction indicated by the first motor to the direction indicated by the third motor.

In some embodiments, a directional wave vibration signal is indicated by a reinforcement modality. The directional wave vibration signal is a signal including synchronized vibration commands causing different vibrators or motors to vibrate synchronously in order to confirm a direction for a user of the tactile belt 115 to follow. In some embodiments, a stop vibration signal indicated by a stop vibration modality is a distinct signal that activates all vibrators or motors 112 on the tactile belt 115 to indicate a stop command. In some embodiments, the selection module 258 sends, via the communication module 252 and the second communication unit 258, a selected vibration signal to the tactile belt 115.

Example Modality Storage

Figure 3:
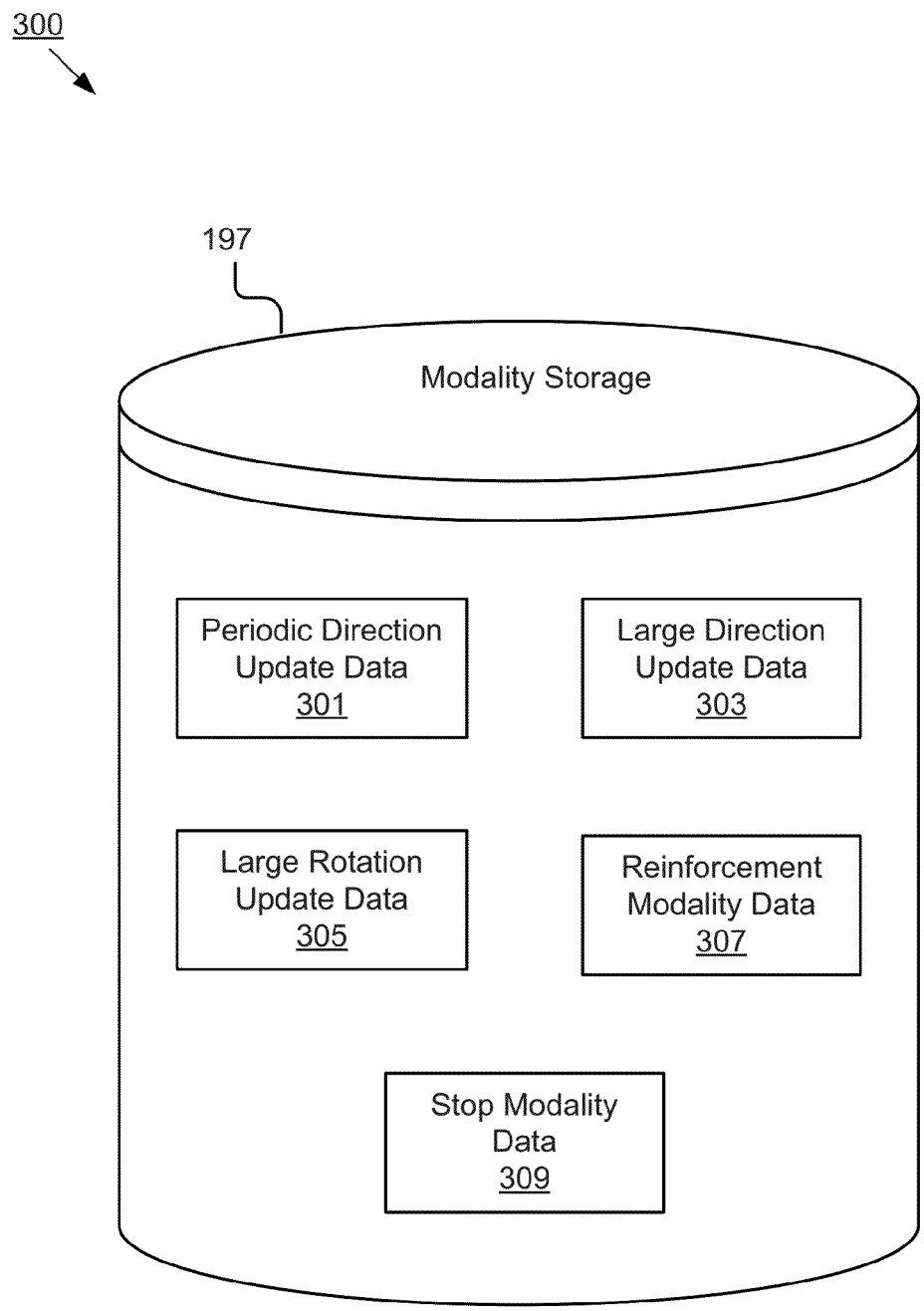
FIG. 3 is a block diagram illustrating one embodiment of a modality storage.

FIG. 3 is a block diagram illustrating one embodiment of a modality storage 197. The modality storage 197 includes periodic direction update data 301, large direction update data 303, large rotation update data 305, reinforcement modality data 307 and stop modality data 309. One skilled in the art will recognize that the modality storage 197 may include other data for providing functionality described herein.

The periodic direction update data 301 includes data describing a periodic direction update modality and its corresponding vibration signal. For example, a periodic direction update modality is determined by the determination module 256 in the condition that a direction change is less than a certain amount. In some embodiments, a periodic direction update modality indicates a vibration pattern instructing a user of the tactile belt 115 to move towards a direction. For example, a periodic direction update modality indicates a periodic impulse vibration signal that causes the tactile belt 115 to vibrate in the pattern instructing the user to move towards a direction.

The large direction update data 303 includes data describing a large direction update modality and its corresponding vibration signal. For example, a large direction update modality is determined by the determination module 256 in the condition that a direction change is larger than a certain amount and a user rotation is not needed. In some embodiments, a large direction update modality indicates a vibration pattern instructing a user of the tactile belt 115 to turn onto a new direction substantially different from a previous direction. For example, a large direction update modality indicates a constant vibration signal that causes the tactile belt 115 to vibrate in the pattern instructing the user to turn onto a new direction substantially different from a previous direction.

The large rotation update data 305 includes data describing a large rotation update modality and its corresponding vibration signal. For example, a large rotation update modality is determined by the determination module 256 in the condition that a direction change is larger than a certain amount and also a user rotation is needed. In some embodiments, a large rotation update modality indicates a vibration pattern instructing a user of the tactile belt 115 to rotate around self to follow a new direction substantially different from a previous direction. For example, a large rotation update modality indicates a rotation vibration signal that causes the tactile belt 115 to vibrate in the pattern instructing the user to rotate around self to follow a new direction substantially different from a previous direction.

The reinforcement modality data 307 includes data describing a reinforcement modality and its corresponding vibration signal. For example, a reinforcement modality is determined by the determination module 256 in the condition that a direction change is less than a certain amount and a certain period of time has lapsed since last direction change. In some embodiments, a reinforcement modality indicates a vibration pattern instructing a user of the tactile belt 115 to keep following a direction. For example, a reinforcement modality indicates a directional wave vibration signal that causes the tactile belt 115 to vibrate in the pattern instructing the user of the tactile belt 115 to keep following a direction.

The stop modality data 309 includes data describing a stop modality and its corresponding vibration signal. For example, a stop modality is determined by the determination module 256 in the condition that a destination is within a certain distance to the user. In some embodiments, a stop modality indicates a vibration pattern instructing a user of the tactile belt 115 to stop going forward. For example, a stop modality indicates a stop vibration signal that causes the tactile belt 115 to vibrate in the pattern instructing the user of the tactile belt 115 to stop going forward.

Methods

Figure 4:
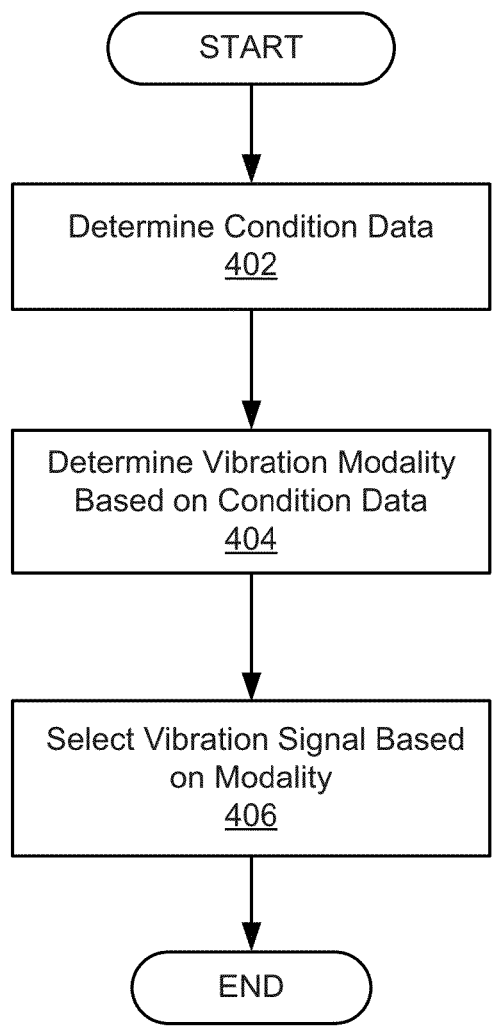
FIG. 4 is a flow diagram of one embodiment of a method for selecting a vibration signal based on a modality.

FIG. 4 is a flow diagram of one embodiment of a method 400 for selecting a vibration signal based on a modality. In the illustrated embodiment, the method 400 can include determining 402 condition data based on path data and location data. For example, the condition module 254 receives path data describing a path for a user of a tactile belt 115 and location data describing a location for the user of the tactile belt 115. The condition module 254 uses the path data and the location data to determine condition data. For example, the condition data includes direction data describing a direction change. The method 400 can also include determining 404 a vibration modality based on the condition data. For example, the determination module 256 determines, based on the condition data, a vibration modality to instruct the user of the tactile belt 115 to follow the path. The method 400 can include selecting 406 a vibration signal based on the vibration modality. For example, the selection module 258 selects a vibration signal indicated by the vibration modality.

Figure 5:
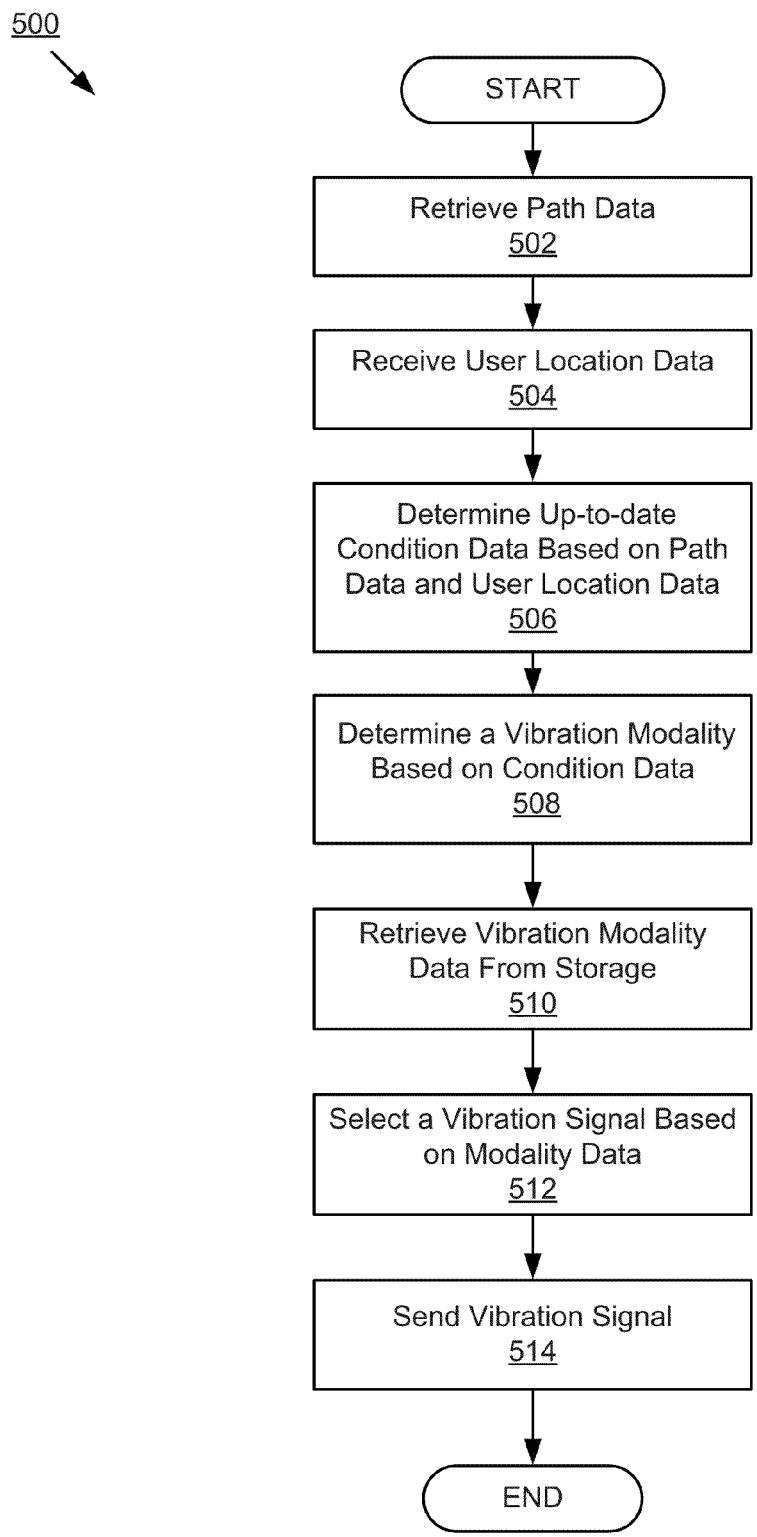
FIG. 5 is a flow diagram of another embodiment of a method for selecting a vibration signal based on a modality.

FIG. 5 is a flow diagram of another embodiment of a method 500 for selecting a vibration signal based on a modality. In the illustrated embodiment, the method 500 can include retrieving 502 path data from the tracking application 109. For example, the path data describing a path planned by the tracking application 109 for a user of a tactile belt 115. The method 500 can also include receiving 504 user location data from the tracking application 109. For example, the user location data describes a location for the user of the tactile belt 115. The method 500 can include determining up-to-date condition data based on the path data and the user location data. For example, the condition module 254 determines condition data periodically in a certain interval, e.g., every one second, every five seconds, every 10 seconds, every 50 seconds, etc. The condition data can include one or more of direction data describing a direction change, rotation data indicating if a user rotation is needed, time data describing how long time has lapsed since last direction change and destination data indicating if the destination is within a certain distance to the user of the tactile belt 115. The method 500 can also include determining 508 a vibration modality based on the condition data. For example, if the determination module 256 determines that the direction change is larger than a certain amount and that a user rotation is needed, the determination module 256 determines to use a large rotation update modality of vibration to instruct the user of the tactile belt 115 to move. The determining 508 a vibration modality based on the condition data will be described in further detail with reference to FIG. 6.

The method 500 can include retrieving 510 vibration modality data from storage. For example, the selection module 258 receives the determined vibration modality (e.g., a large rotation update modality) from the determination module 256 and retrieves vibration modality data (e.g., large rotation update data) describing the determined vibration modality (e.g., a large rotation update modality) from the modality storage 197. The method 500 can also include selecting 512 a vibration signal based on the modality data. For example, the large rotation update data indicates a rotation vibration signal. The method 500 can include sending 514 the vibration signal to the microcontroller 110 controlling the motors 112 to vibrate.

Figure 6:
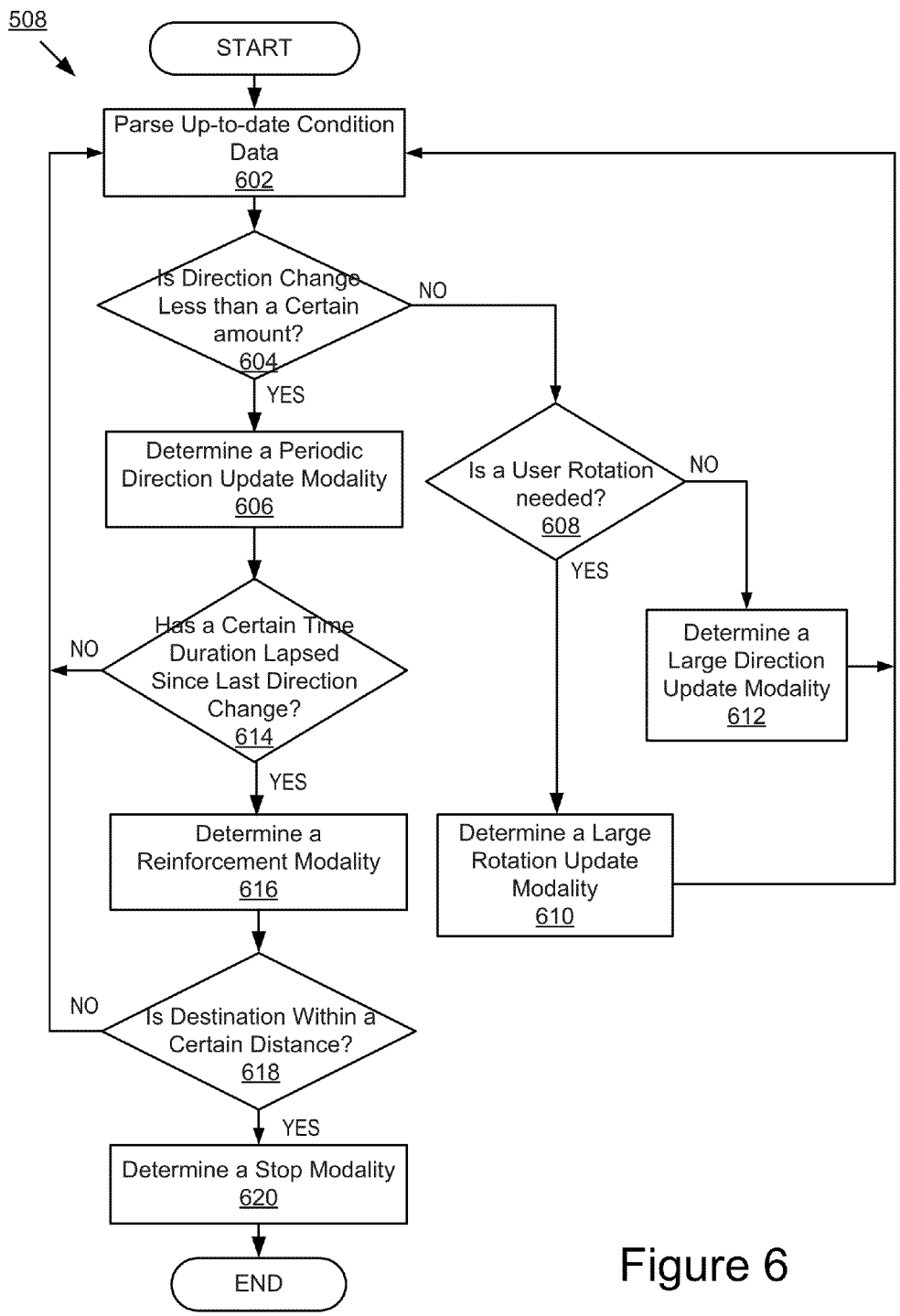
FIG. 6 is a flow diagram of one embodiment of a method for determining a modality for providing navigation guidance based on condition data.

FIG. 6 is a flow diagram of one embodiment of a method 600 for determining a modality for providing navigation guidance based on condition data. In the illustrated embodiment, the method 600 can include parsing 602 up-to-date condition data. For example, the determination module 256 parses the up-to-date condition data. The method 600 can also include determining 604 whether a direction change is less than a certain amount. If so, the method 600 may include determining 606 a periodic direction update modality. For example, if the determination module 256 determines that a direction change is less than 0.2 rad, the determination module 256 determines to use a periodic direction update modality. If a direction change is not less than a certain amount, the method 600 may include determining 608 whether a user rotation is needed. If a user rotation is needed, the method 600 may include determining 610 a large rotation update modality. If a user rotation is not needed, the method 600 may include determining 612 a large direction update modality. After determining 610 a large rotation update modality or determining 612 a large direction update modality, the method 600 may turn back to parsing 602 up-to-date condition data.

The method 600 can also include determining 614 whether a certain time duration has lapsed since last direction change. If a certain time duration has lapsed since last direction change, the method 600 may include determining 616 a reinforcement modality. If it has not been a certain time since last direction change, the method 600 may turn back to parsing 602 up-to-date condition data. The method 600 can also include determining 618 whether a destination is within a certain distance to the user of the tactile belt 115. If so, the method 600 can include determining 620 a stop modality. If the destination is not within a distance, the method 600 may turn back to parsing 602 up-to-date condition data.

Graphical Representations

Figure 7A:
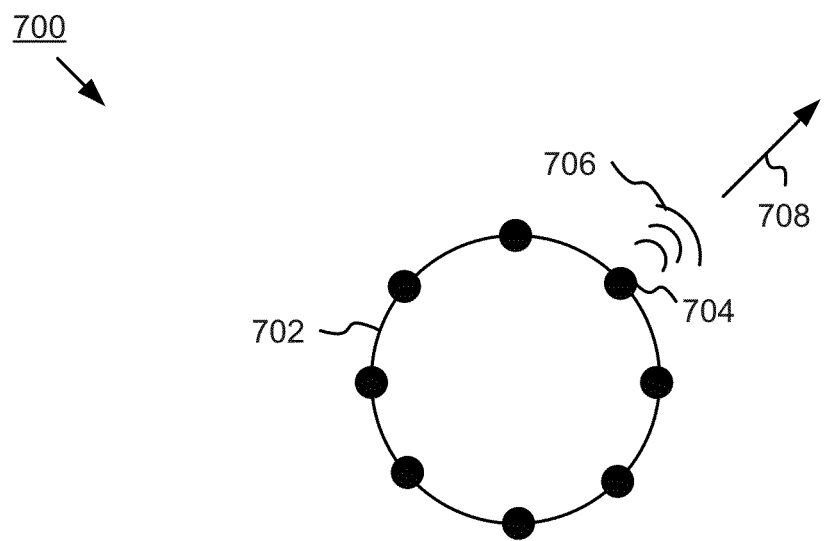
FIG. 7A is a graphic illustration of one embodiment of motors of a tactile belt with a periodic impulse vibration signal applied based on a periodic direction update modality.

FIG. 7A is a graphic illustration of one embodiment of motors 112 of a tactile belt 115 with a periodic impulse vibration signal applied based on a periodic direction update modality. In the illustrated embodiment, element 702 is a graphical representation for a tactile belt 115. Element 704 is a graphical representation for one motor 112 included on the tactile belt 702. Element 706 is a graphical representation for vibration of the motor 704. For example, driven by a periodic impulse vibration signal, the motor 704 vibrates accordingly to instruct a user of the tactile belt 702 to move. Element 708 is a graphical representation for a direction indicated by the vibration 706 of the motor 704. For example, the motor 704 vibrates according to a periodic impulse vibration signal in order to instruct the user of the tactile belt 702 to move towards the direction 708.

Figure 7B:
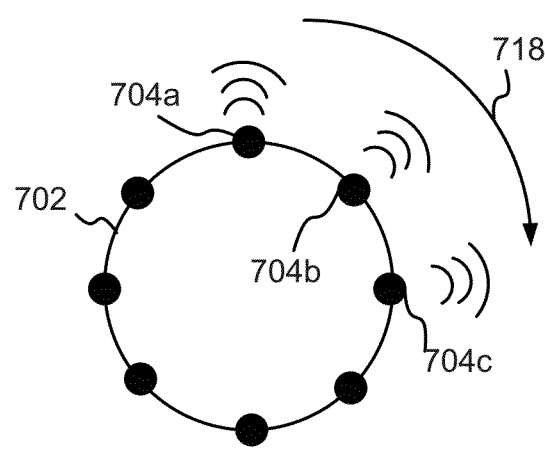
FIG. 7B is a graphic illustration of one embodiment of motors of a tactile belt with a constant vibration signal applied based on a large direction update modality.

FIG. 7B is a graphic illustration of one embodiment of motors 112 of a tactile belt 115 with a constant vibration signal applied based on a large direction update modality. In the illustrated embodiment, element 702 is a graphical representation for a tactile belt 115. Elements 704a, 704b, 704c are graphical representations for motors 112 included in the tactile belt 115. For example, the motors 704a, 704b, 704c are adjacent to each other and located on the tactile belt 115. Element 718 is a graphical representation for a direction indicated by vibration of the motors 704a, 704b, 704c. In the illustrated embodiment, the motors 704a, 704b, 704c vibrate, driven by a constant vibration signal, to instruct a user of the tactile belt 115 to move towards the direction 718.

Figure 7C:
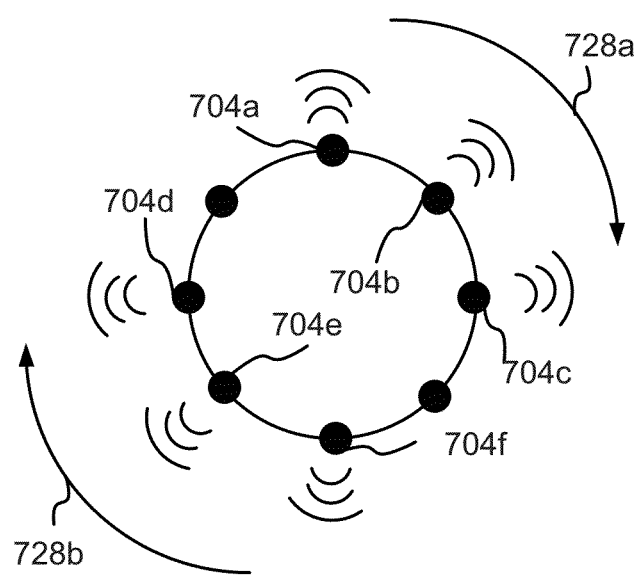
FIG. 7C is a graphic illustration of one embodiment of motors of a tactile belt with a rotation vibration signal applied based on a large rotation update modality.

FIG. 7C is a graphic illustration of one embodiment of motors 112 of a tactile belt 115 with a rotation vibration signal applied based on a large rotation update modality. In the illustrated embodiment, elements 704a, 704b, 704c, 704d, 704e, 704f are graphical representations for motors 112 included on the tactile belt 115. Elements 728a, 728b are graphical representations for directions indicated by vibration of the motors 704a, 704b, 704c, 704d, 704e, 704f. In the illustrated embodiment, the motors 704a, 704b, 704c, 704d, 704e, 704f vibrate, driven by a rotation vibration signal, to indicate a user of the tactile belt 115 to turn according to the directions 728a, 728b. For example, the rotation vibration signal includes a sequential vibration commands. The motors 704a, 704b, 704c, 704d, 704e, 704f vibrate, driven by the rotation vibration signal, sequentially so that the user of the tactile belt 115 learns of the instruction for rotating according to the directions 728a, 728b.

Figure 7D:
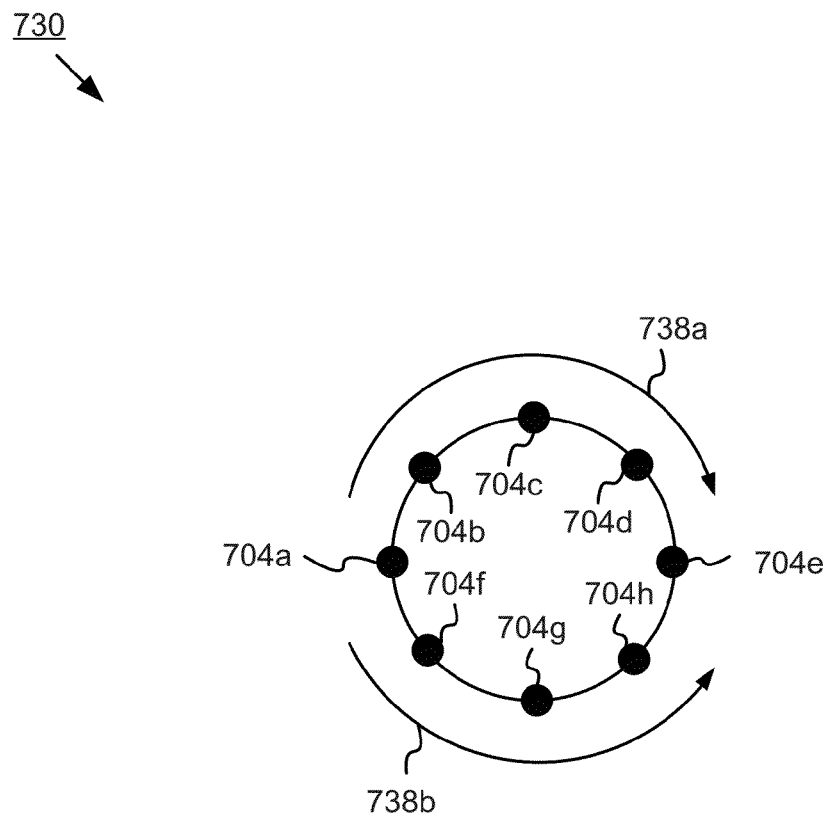
FIG. 7D is a graphic illustration of one embodiment of motors of a tactile belt with a directional wave vibration signal applied based on a reinforcement modality.

FIG. 7D is a graphic illustration of one embodiment of motors 112 of a tactile belt 115 with a directional wave vibration signal applied based on a reinforcement modality. In the illustrated embodiment, elements 704a, 704b, 704c, 704d, 704e, 704f, 704g, 704h are graphical representations for motors 112 included on the tactile belt 115. Elements 738a, 738b are graphical representations for directions indicated by vibration of the motors 704a, 704b, 704c, 704d, 704e, 704f, 704g, 704h. In the illustrated embodiment, motors 704a, 704b, 704c, 704d, 704e, 704f, 704g, 704h vibrate, driven by a directional wave vibration signal, to instruct a user of the tactile belt 115 to keep moving according to the directions 738a, 738b. For example, the motors 704a, 704b, 704c, 704d, 704e, 704f, 704g, 704h vibrate, driven by the directional wave vibration signal, synchronously so that the user of the tactile belt 115 learns of the instruction for keeping moving according to the directions 738a, 738b.

Figure 7E:
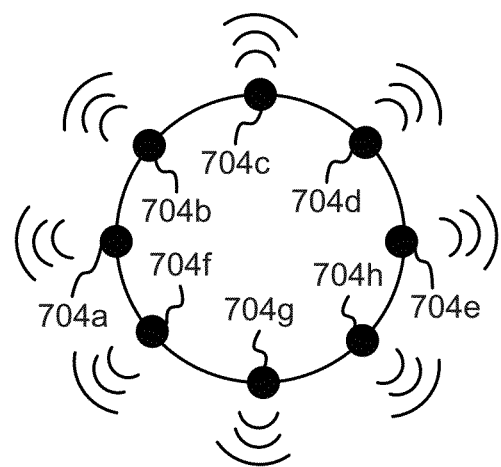
FIG. 7E is a graphic illustration of one embodiment of motors of a tactile belt with a stop vibration signal applied based on a stop modality.
Figure 7E:
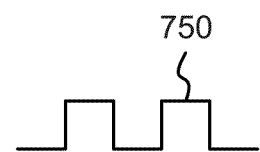

FIG. 7E is a graphic illustration of one embodiment of motors 112 of a tactile belt 115 with a stop vibration signal applied based on a stop modality. In the illustrated embodiment, elements 704a, 704b, 704c, 704d, 704e, 704f, 704g, 704h are graphical representations for motors 112 included on the tactile belt 115. The motors 704a, 704b, 704c, 704d, 704e, 704f, 704g, 704h vibrate, driven by a stop vibration signal, to instruct a user of the tactile belt 115 to stop moving. Element 750 is a graphical representation for a stop vibration signal.

Figure 8:
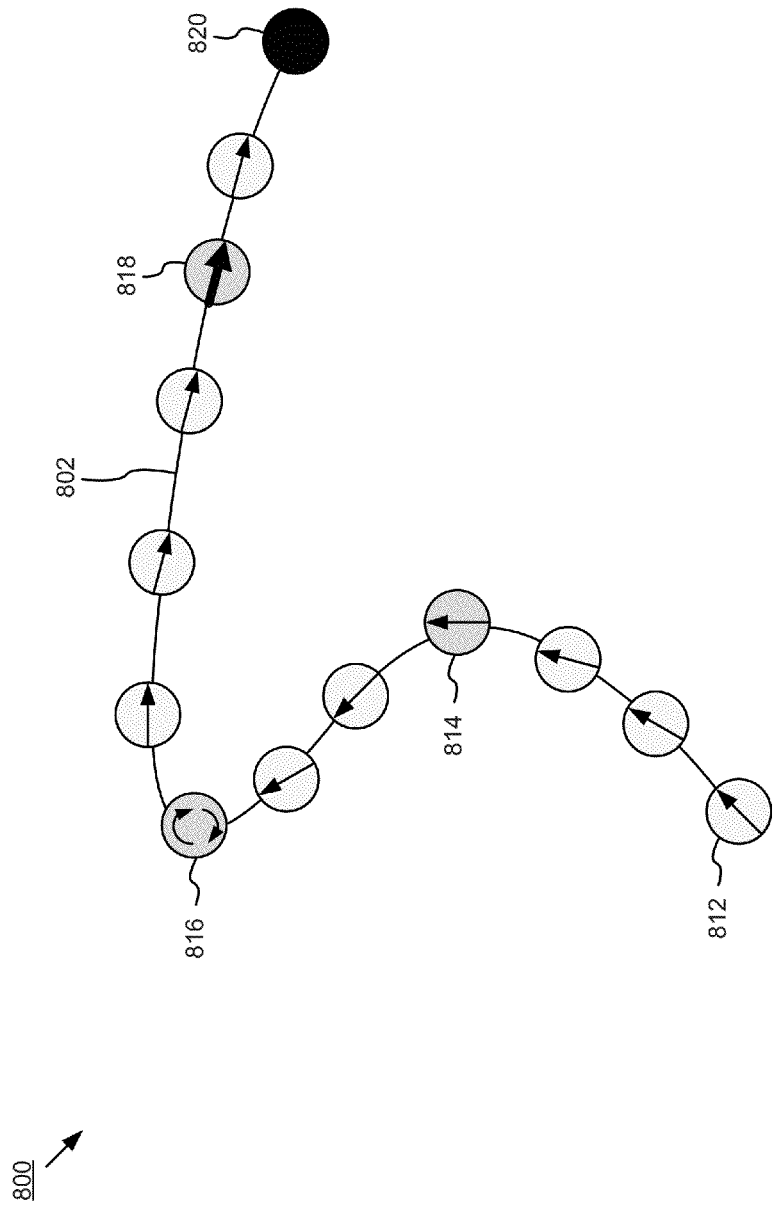
FIG. 8 is a graphic illustration of one embodiment of a tactile belt system providing navigation guidance based on a plurality of modalities.

FIG. 8 is a graphic illustration of one embodiment of a tactile belt system providing navigation guidance based on a plurality of modalities. In the illustrated embodiment, element 802 is a graphical representation of a path planned by the tracking application 109 for a user of a tactile belt 115. Element 812 is a graphical representation for the tactile belt 115 acting based on a periodic direction update modality to instruct the user of the tactile belt 115 to follow the path 802. For example, motors 112 on the tactile belt 115 vibrate based on a periodic impulse vibration signal indicated by the periodic direction update modality to instruct the user of the tactile belt 115 to move to a direction so that the user of the tactile belt 115 can follow the path 802.

Element 814 is a graphical representation for the tactile belt 115 acting based on a large direction update modality to instruct the user of the tactile belt 115 to follow the path 802. For example, motors 112 on the tactile belt 115 vibrate based on a constant vibration signal indicated by the large direction update modality to instruct the user of the tactile belt 115 to move to a direction so that the user of the tactile belt 115 can follow the path 802.

Element 816 is a graphical representation for the tactile belt 115 acting based on a large rotation update modality to instruct the user of the tactile belt 115 to follow the path 802. For example, motors 112 on the tactile belt 115 vibrate based on a rotation vibration signal indicated by the large rotation update modality to instruct the user of the tactile belt 115 to rotate around self and move to a direction so that the user of the tactile belt 115 can follow the path 802.

Element 818 is a graphical representation for the tactile belt 115 acting based on a reinforcement modality to instruct the user of the tactile belt 115 to follow the path 802. For example, motors 112 on the tactile belt 115 vibrate based on a directional wave vibration signal indicated by the reinforcement modality to instruct the user of the tactile belt 115 to keep moving to a direction so that the user of the tactile belt 115 can follow the path 802.

Element 820 is a graphical representation for the tactile belt 115 acting based on a stop modality to instruct the user of the tactile belt 115 to stop at the end of the path 802. For example, motors 112 on the tactile belt 115 vibrate based on a stop vibration signal indicated by the stop modality to instruct the user of the tactile belt 115 to stop moving so that the user of the tactile belt 115 can stop at the end of the path 802.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method, comprising:
receiving path data describing a path planned for a user associated with a tactile belt and location data describing a location of the user associated with the tactile belt;
determining, based on the path data and the location data, condition data describing a direction change value and a period of time that has lapsed since a last direction change occurred;
determining a vibration modality based on the direction change value and the period of time that has lapsed since the last direction change occurred, the vibration modality describing a pattern for vibration and indicating a vibration signal; and
applying the vibration signal indicated by the vibration modality to the tactile belt to instruct the user associated with the tactile belt to follow the path.

2. The method of claim 1, wherein the vibration modality includes at least one of a periodic direction update modality, a large direction update modality, a large rotation update modality, a reinforcement modality and a stop modality.

3. The method of claim 1, wherein the vibration signal includes at least one of a periodic impulse vibration signal, a constant vibration signal, a rotation vibration signal, a directional wave vibration signal and a stop vibration signal.

4. The method of claim 1, wherein the condition data further describes if the direction change value is larger than a certain amount.

5. The method of claim 1, wherein the condition data also includes rotation data that indicates if a user rotation is needed.

6. The method of claim 1, wherein the condition data also includes destination data that indicates if a destination is within a certain distance.

7. The method of claim 1, wherein the vibration modality is a reinforcement modality determined based on the direction change value being less than a certain amount and the period of time that has lapsed since the last direction change satisfying a certain time period.

8. The method of claim 7, wherein the reinforcement modality instructs the user associated with the tactile belt to keep following an existing direction.

9. The method of claim 7, wherein applying the vibration signal includes applying a directional wave vibration signal associated with the reinforcement modality, the directional wave vibration signal including synchronized vibration commands causing different motors of the tactile belt to vibrate synchronously in a directional wave pattern.

10. A system comprising:
one or more processors, the processors being configured to:
receive path data describing a path planned for a user associated with a tactile belt and location data describing a location of the user associated with the tactile belt;
determine, based on the path data and the location data, condition data describing a direction change value and a period of time that has lapsed since a last direction change occurred;
determine a vibration modality based on the direction change value and the period of time that has lapsed since the last direction change occurred, the vibration modality describing a pattern for vibration and indicating a vibration signal; and
apply the vibration signal indicated by the vibration modality to the tactile belt to instruct the user associated with the tactile belt to follow the path.

11. The system of claim 10, wherein the vibration modality includes at least one of a periodic direction update modality, a large direction update modality, a large rotation update modality, a reinforcement modality and a stop modality.

12. The system of claim 10, wherein the vibration signal includes at least one of a periodic impulse vibration signal, a constant vibration signal, a rotation vibration signal, a directional wave vibration signal and a stop vibration signal.

13. The system of claim 10, wherein the condition data further describes if the direction change value is larger than a certain amount.

14. The system of claim 10, wherein the condition data also includes rotation data that indicates if a user rotation is needed.

15. The system of claim 10, wherein the condition data also includes destination data that indicates if a destination is within a certain distance.

16. The system of claim 10, wherein the vibration modality is a reinforcement modality determined based on the direction change value being less than a certain amount and the period of time that has lapsed since the last direction change satisfying a certain time period.

17. The system of claim 16, wherein the reinforcement modality instructs the user associated with the tactile belt to keep following an existing direction.

18. The system of claim 16, wherein applying the vibration signal includes applying a directional wave vibration signal associated with the reinforcement modality, the directional wave vibration signal including synchronized vibration commands causing different motors of the tactile belt to vibrate synchronously in a directional wave pattern.

19. A non-transitory computer readable storage medium including a computer readable program, wherein the computer readable program when executed on a computer causes the computer to:
receive path data describing a path planned for a user associated with a tactile belt and location data describing a location of the user associated with the tactile belt;
determine, based on the path data and the location data, condition data describing a direction change value and a period of time that has lapsed since a last direction change occurred;
determine a vibration modality based on the direction change value and the period of time that has lapsed since the last direction change occurred, the vibration modality describing a pattern for vibration and indicating a vibration signal; and
apply the vibration signal indicated by the vibration modality to the tactile belt to instruct the user associated with the tactile belt to follow the path.

20. The non-transitory computer readable storage medium of claim 19, wherein the vibration modality includes at least one of a periodic direction update modality, a large direction update modality, a large rotation update modality, a reinforcement modality and a stop modality.

21. The non-transitory computer readable storage medium of claim 19, wherein the vibration signal includes at least one of a periodic impulse vibration signal, a constant vibration signal, a rotation vibration signal, a directional wave vibration signal and a stop vibration signal.

22. The non-transitory computer readable storage medium of claim 19, wherein the condition data further describes if the direction change value is larger than a certain amount.

23. The non-transitory computer readable storage medium of claim 19, wherein the condition data also includes rotation data that indicates if a user rotation is needed.

24. The non-transitory computer readable storage medium of claim 19, wherein the condition data also includes destination data that indicates if a destination is within a certain distance.

25. The non-transitory computer readable storage medium of claim 19, wherein the vibration modality is a reinforcement modality determined based on the direction change value being less than a certain amount and the period of time that has lapsed since the last direction change satisfying a certain time period.

26. The non-transitory computer readable storage medium of claim 25, wherein the reinforcement modality instructs the user associated with the tactile belt to keep following an existing direction.

27. The non-transitory computer readable storage medium of claim 25, wherein applying the vibration signal includes applying a directional wave vibration signal associated with the reinforcement modality, the directional wave vibration signal including synchronized vibration commands causing different motors of the tactile belt to vibrate synchronously in a directional wave pattern.

* * * * *